June 10, 1952  J. V. BAUER ET AL  2,599,604
FILTER ELEMENT
Filed July 13, 1949  3 Sheets-Sheet 1
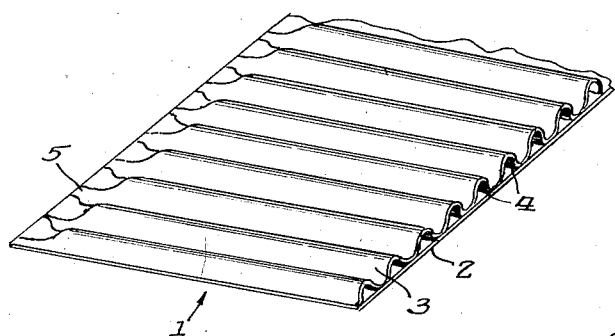
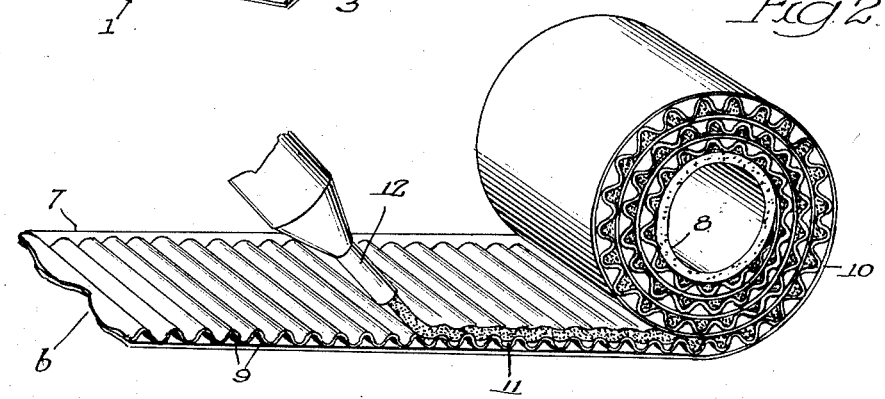
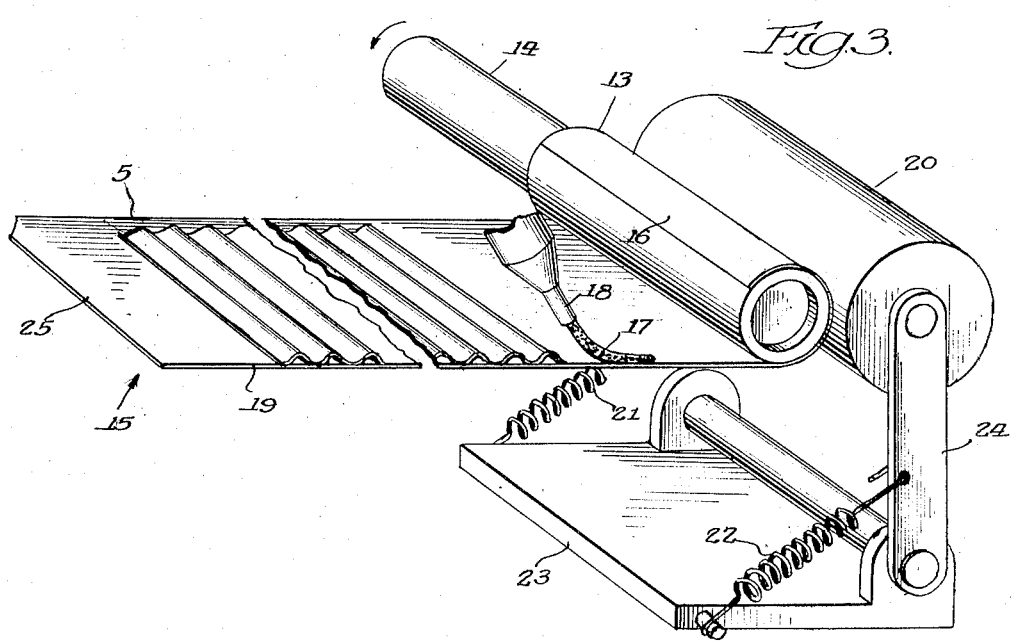
Inventor
Jordan V. Bauer and
Russell H. Curtis
By: Spencer, Marzall, Johnston & Cook
Attys

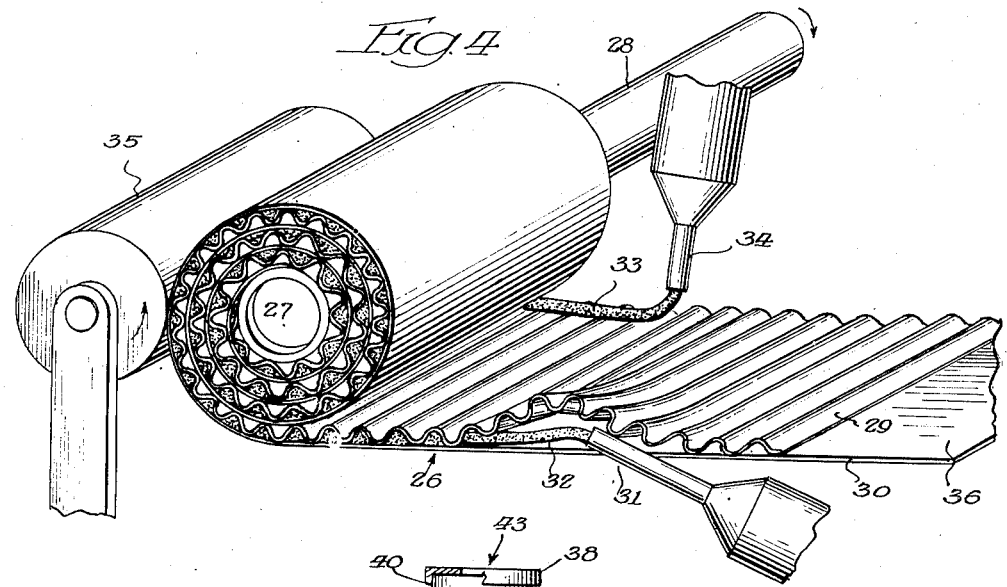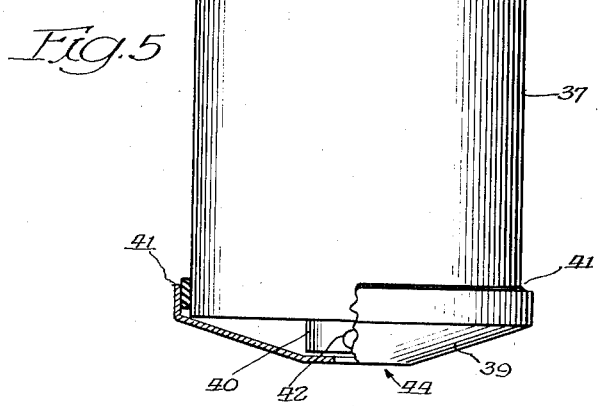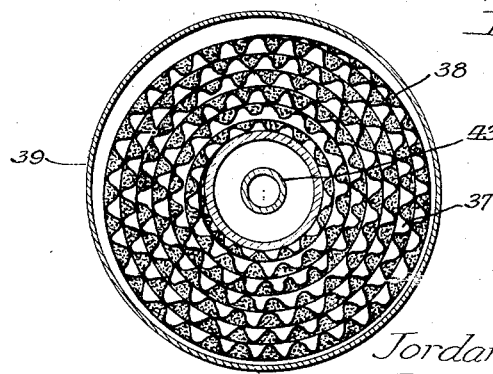

June 10, 1952  J. V. BAUER ET AL  2,599,604
FILTER ELEMENT

Filed July 13, 1949  3 Sheets-Sheet 3

Inventor
Jordan V. Bauer and
Russell H. Curtis.
By: Spencer, Marzall, Johnston & Cook
Attys Patented June 10, 1952

2,599,604

UNITED STATES PATENT OFFICE 2,599,604

FILTER ELEMENT

Jordan V. Bauer, Elmwood Park, and
Russell H. Curtis, St. Charles, Ill.

Application July 13, 1949, Serial No. 104,472

6 Claims. (Cl. 210—169)

This invention relates to a new and improved type of filter for the removal of solid particles from fluids and to the construction thereof. The invention more particularly relates to a new and improved type of oil filter for use in internal combustion engines.

One of the objects of the present invention is to provide a filter element which is compact in size and shape and which will have unusually high flow properties and long filtration life.

Another object is to provide a filter element which will have an unusually large filtering surface area.

Another object is to provide a filter which is constructed of readily available materials and which is low in cost and simple to manufacture.

A further object of the invention is to provide a filtering medium which will be resistant to the action of hot oil and contaminating substances normally present therein.

A still further object is to provide a filtering medium which will provide a large surface area, but which will also be rigid enough to withstand considerable fluid pressures without distortion.

Another object of the invention is to provide a compact filter element by employing corrugated paper in a unique construction.

These and other objects of the invention will become more apparent upon consideration of the following description and the drawings in which:

Fig. 1 illustrates a strip of corrugated single faced paper as employed in the practice of the invention;

Fig. 2 represents one of the methods by which the corrugated paper may be constructed into a filter element;

Fig. 3 illustrates another embodiment of the invention by which the corrugated paper is processed into a filter element;

Fig. 4 shows still another embodiment wherein the ends of alternate corrugations are sealed with a cement or adhesive;

Fig. 5 is a view, partly in section, showing the finished filter element of the invention;

Fig. 6 is a top plan view of the filter element of Fig. 5;

Figure 8:
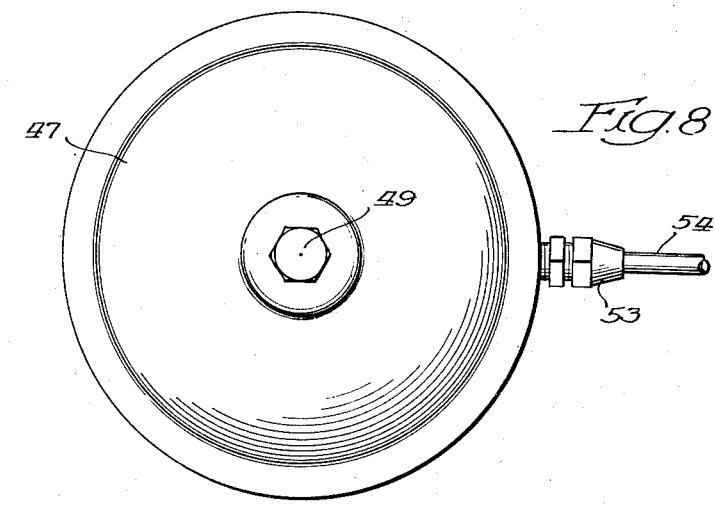
Fig. 8 is a top plan view of the automotive filter of Fig. 7.

According to the present invention, a filter for the removal of solid particles from fluids is prepared by inserting a filter element having novel and unusual characteristics into a casing through which the fluid to be filtered is circulated. The filter element contains a filtering medium which is characterized by a large surface area, structural strength to resist fluid pressures, long life and good flow properties. This novel filtering medium comprises a strip of a single faced corrugated paper in which alternate corrugations are sealed at opposite ends of the corrugations.

To form the filter element, one end of the single faced corrugated strip is bonded to a core and then convolute wound around the core to form a cylindrical unit with the flutes of the corrugations running parallel to the axis of the core. As the corrugated strip is wound (or prior to the winding) the open ends of the confined flutes are sealed shut along one edge of the strip. During the winding operation the alternate open flutes of the corrugated paper strip likewise become confined. The open ends of these alternate flutes are sealed shut along the opposite edge of the strip. After the unit has been wound, the free end of the strip is bonded to the body of the unit with a piece of gummed tape or other adhesive means so as to prevent unwinding. The result is a cylindrical filter unit wherein any fluid passing into the non-sealed flute openings at one end must pass through the paper walls of the corrugations and emit from the openings formed by the alternate non-sealed flutes at the opposite end. In this manner an unusually large area of filtration surface is made available, and the ratio of this area to the outside dimensions of the unit is large.

Single faced corrugated paper is a well known product which is manufactured in large quantities and is used for the most part as a protective packing or wrapping material. High speed manufacture consists of corrugating one web of paper by means of heated fluted rolls, applying an adhesive to the tips of the corrugations and then bringing the corrugated web into contact with a flat web of paper and forming a bond between the two sheets. The resultant single faced corrugated paper comprises a corrugated sheet bonded at the tips of the corrugations to a flat sheet of paper.

With reference to the drawings, Fig. 1 illustrates a strip of corrugated single faced paper prepared according to a method which will be described in greater detail hereinafter. The strip of corrugated paper 1 is composed of a flat paper web 2, and a corrugated paper web 3 suitably attached at the valleys of the corrugations to the flat web 2, thereby forming a series of flutes 4. The corrugations 3 have been flattened along one edge 5 and the flutes 4 have been closed along the edge 5 by sewing the upper web 3 to the lower web 2. This method represents a simple means of closing one end of the flutes in the preparation of the corrugated paper for use as a filtering medium.

In Fig. 2 a strip of corrugated paper sewed at one edge as in Fig. 1 is further constructed into a filter element according to the practice of this invention. In Fig. 2 the paper strip 6, having a sealed end sewed edge 7 is convolute wound around a cylindrical core 8 in the preparation of a cylindrical filter element. The flutes 9 having been sealed at the edge 7, it is now desired to seal the alternate flutes 10 in order that the passage of liquid between flutes can be accomplished only by passing through a layer of paper. The alternate flute openings 10 are sealed by the application of a self-hardening semi-fluid cement 11 which is applied as illustrated by an extruding nozzle 12. A sufficient amount of cement is applied along the edge of the paper strip so that alternate flutes terminating at this edge will be sealed when the paper is wound about the cylindrical core.

A preferred method of manufacture of the present filter element is illustrated in Fig. 3. As shown therein, a cylindrical core 13 is mounted upon a rotating mandrel 14 and is adapted to be rotated thereby. The corrugated strip 15 is attached to the core 13 by means of a paper leader strip 16 which is passed about the core 13. A strip of corrugated paper is employed such as the one shown in Fig. 1, in which one edge of the strip is sewed at 5 to thereby seal alternate flutes of the corrugated paper. Rotation of the core 13 by means of the mandrel 14 causes the corrugated paper to be convolute wound about the core.

As the corrugated strip 15 is wound, a self-hardening semi-fluid cement 17 is extruded from the nozzle 18 and is applied along the edge 19 of the paper strip. The semi-fluid cement secures the upwardly facing flutes and operates to seal the flutes during the winding operation. The flutes sealed by the cement are alternate flutes from those which are sealed by the sewing operation. The spring loaded pressure roll 20 assists in forming a tight even wind of the corrugated paper about the core 13, and by its pressure forces the cement 17 into the upwardly facing flutes so as to properly close them. The spring loading on the pressure roll 20 is supplied by means of the springs 21 and 22 which operate between the base member 23 and the positioning arms 24. When the winding of the filter element has been completed, the leader strip 25 is secured to the body of the unit to prevent unwinding of the corrugated paper.

In Fig. 4 an alternative method of manufacture of the corrugated paper filter element is illustrated. In this particular embodiment both edges of the corrugated strip are sealed by use of a semi-fluid cement. A corrugated paper strip 26 is wound about a cylindrical core 27 which is caused to rotate by a mandrel 28. One edge of the corrugated paper is prepared with no bond so that the corrugated web 29 may be loosened from the flat web 30 and the extruder nozzle 31 can be inserted between the two webs. A layer of cement 32 is extruded between the corrugated web and the flat web 30 in such a manner as to seal the downwardly extending flutes at the edge of the strip. Another layer of cement 33 is placed over the corrugated web 29 at the opposite edge of the paper strip 26. The cement is deposited from the extruder nozzle 34 in sufficient amount to fill the upwardly extending flutes at the edge of the strip. As the cemented corrugated strip is wound about the core, the cement serves to seal alternate flutes at opposite ends. The spring loaded pressure roll 35 is employed here as in the device shown in Fig. 3 to assist in forming a tight even wind of the corrugated paper. When the winding of the corrugated paper strip has been completed, the leader strip 36 is secured to the body of the unit to prevent unwinding.

The single faced corrugated paper employed as the filtration medium in this invention may be manufactured according to the accepted practice hereinbefore described. The quality of the paper material chosen for the manufacture of the single faced corrugated paper may be varied widely depending upon the purpose for which the filter is to be used. We have found that the unsized kraft papers of about 9 to 12 thousandths of an inch in caliper, such as are normally used in the preparation of standard corrugated paper, are quite satisfactory for ordinary filtration purposes. Special papers specifically prepared for filtration purposes may likewise be used effectively. It is contemplated that those familiar with the art will readily adapt the invention to the use of any specific type of paper to solve a special problem confronting them. The paper materials used in the fabrication of the corrugated strip for the present filter unit should be of sufficiently low degree of hydration as to be readily permeable by the fluids to be filtered, while, at the same time, being of sufficient density to prevent the passage of solid particles therethrough. If a high degree of rigidity is desired in the filter unit, papers of the above-described nature may be impregnated with synthetic resins such as those of the phenolic type.

If a very high degree of strength and rigidity is desired in the filter unit it may be impregnated with a suitable sizing solution. A 5% solution of a phenolic resin in ethyl alcohol is an example of a sizing impregnant satisfactory for this purpose. One procedure is to dip the filter unit in the resin solution, allow it to drain, and then dry it in an oven at sufficient temperature to cure the resin.

In the manufacture of single faced corrugated paper for the purpose of this invention it is desirable to fabricate the paper in relatively wide widths and then to slit the wide strip into narrower strips of the required width for individual filter elements.

A number of alternative methods will be suggested to those familiar with the corrugated paper art and the examples described herein are intended to be merely illustrative of the broad idea. For example, in Fig. 4, the application of cement to opposite sides of the corrugated web requires that a non-bonded area be present between the corrugated sheet and the flat sheet along one edge to facilitate the introduction of cement between the two sheets. Non-bonded areas of this nature are readily obtained by placing wipers on the adhesive applicator roll of the corrugating machine and spacing them in proper relation to the slitter knives so that slitting takes place near the middle of the non-bonded area.

In another method of construction, the open ends of the corrugations are closed by flattening the corrugations along one edge and sewing them shut. This method of closure may be facilitated by scoring the single faced corrugated sheet in the proper area during the slitting operation. Here again it is considered that the details of such procedures will be apparent to those familiar with the art of manufacturing corrugated paper.

Continuing with the description of the drawings, Fig. 5 shows a side view in partial section of the assembled filter element employing the corrugated filter medium disclosed in Figs. 1 to 4. In this particular embodiment the filter element is adapted for use in an automotive engine for filtering the lubricating oil. The cylindrical corrugated filter medium 37 is fitted with formed sheet metal ends 38 and 39 to adapt it for mounting in a conventional automotive type filter casing. The core 40 may be seen extending at either end of the corrugated filter medium 37 to thereby support the metal adapter fittings 38 and 39. The metallic adapter 39 is bonded in fluid tight engagement with the corrugated element 37 by means of a sealing compound 41. The bottom end of the core 40 is provided with one or more holes 42 through which the filtered oil is allowed to pass to the exit standpipe of the oil filter housing. The metallic adapter 38 has an opening 43 therein to allow the filter element to be mounted on the standpipe of a conventional filter casing. A similar opening 44 in the metallic adapter 39 serves a similar purpose.

Fig. 6 is a top plan view of the filter element shown in Fig. 5. In this view the central annular opening 43 in the top metallic adapter 38 is clearly shown. The fluid tight bond between the corrugated medium 37 and the lower metallic adapter 39 is also shown. In Fig. 6 the sealing ends of alternate flutes are graphically represented.

The flutes which have open ends in Fig. 6 are sealed at the opposite ends. Hence, it will be evident that fluid forced into the open flutes at the top of the filter element in Fig. 5 must pass through the paper strips in order to emit from the open end of alternate flutes at the bottom of the filter element.

Figure 7:
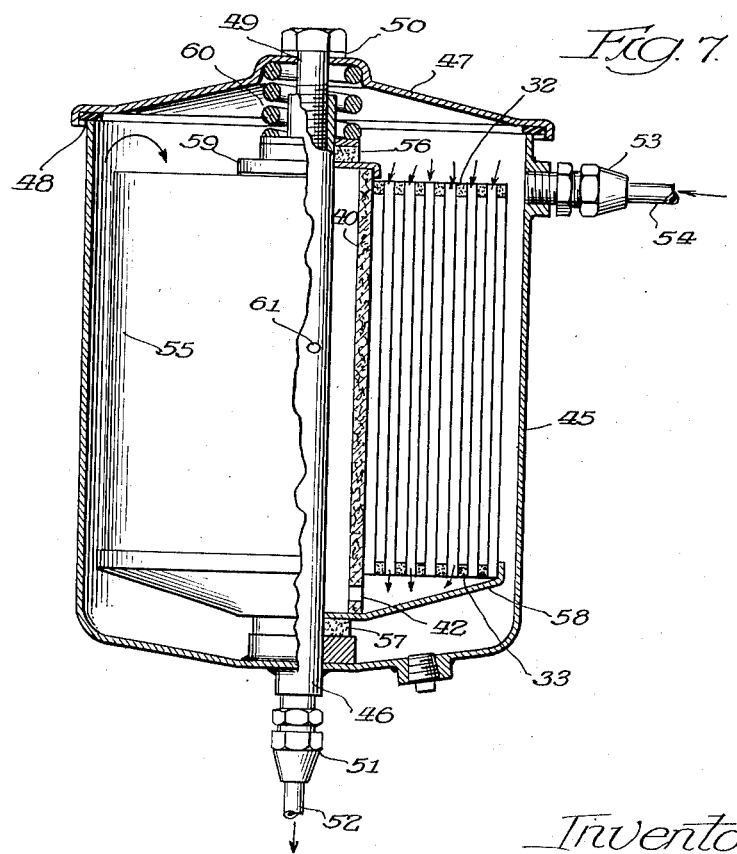
Fig. 7 is a side view of an automotive oil filter showing in partial section the completed filter element of Fig. 5 enclosed therein.

In Fig. 7 the partially sectioned side view of an automotive oil filter casing is illustrated. The cylindrical body 45 of the casing is fitted with a centrally located standpipe 46 upon which is mounted a replaceable filter element. A removable cover 47 forms the top of the housing. Fluid tight sealing with the body 45 is provided with the assistance of a gasket 48. The cover 47 is securely fastened by means of the bolt 49 threaded into the standpipe 46. Leakage about the bolt 49 is prevented by means of the fiber washer 50. The lower end of the standpipe 46 is fitted with a standard coupling 51 by means of which the standpipe is connected to the fluid outlet line 52. A similar coupling 53 is mounted on the side wall of the casing 45 and permits the introduction of fluid from the inlet line 54.

Mounted about the standpipe 46 and within the filter casing 45 is a filter element corresponding to that shown in Figs. 5 and 6. The corrugated filter medium 55 is shown in partial section so that the oppositely sealed ends of alternate corrugations are clearly shown. The filter element is maintained in position by means of the cork sealing washers 56 and 57 which are adapted to prevent leakage of fluid about the standpipe 46. The washers are held in fluid tight engagement with the metallic adapters 58 and 59 and about the standpipe 46 by means of the compressed spring 60. The spring bears against the upper washer 56 and against the underside of the casing top 47.

Fig. 8 is a top plan view of the assembled filter unit shown generally in Fig. 7.

In the operation of the filter unit described in Figs. 7 and 8, oil from the engine oil pump enters the casing through the inlet pipe 54 and the coupling 53 and is distributed throughout the open areas within the filter casing 45. When the casing has filled with oil and oil enters the non-sealed flute openings at the upper end of the filter element as indicated by the flow arrows. As the flutes fill with oil all the oil is prevented from passing into the bottom of the filter element because these flutes are sealed at the lower end. The oil is then forced to pass through a layer of paper in order to reach a flute which is open to the exhaust side of the filter unit. At this point the solid particles contained in the oil are constrained from passing through the paper. The clean oil emits from the non-sealed flute openings at the lower end of the element as shown by the flow arrows. The cleaned oil is collected within the metallic adapter 58 and is forced to pass through the hole 42 into the hollow space between the core 40 and the standpipe 46. The standpipe 46 has one or a plurality of holes 61 through which the cleaned oil flows into the standpipe and back to the engine through the outlet line 52.

It will be apparent that other equivalent means of performing the operations outlined herein may be used without departing from the spirit of the invention. It is intended that variations in procedure, such as the added step of applying an adhesive to the tips of the corrugations during the winding operation, so as to more firmly bind the unit together, be considered as part of this invention.

The cement used to seal or plug the flute openings may be compounded of any materials that are resistant to the fluids to be filtered. The cement should be of a semi-fluid consistency so that it may be extruded readily onto the corrugations, but not so fluid as to flow out of position. The cement should be sufficiently soft that it will be forced into the valleys of the flutes and form a secure bond in sealing the end of the flutes when the corrugated strip is convolute wound about the core. The cement should not undergo excessive shrinkage during the drying operation since such shrinkage would prevent effective sealing of the flute openings. Phenolic resin varnishes bodied with fillers such as wood flour, starch, kaolin, etc., make satisfactory cement compositions suitable for the present purpose. Other satisfactory cements will be obvious to those familiar with the art of compounding adhesives and sealing compositions.

It will be understood that the filtering unit disclosed herein is not limited to filtering the oil in automotive engines. The unit is also well adapted for filtering other types of fluids or for removing entrained particles in gases. While different applications of this nature would require minor changes in design and possibly different materials of construction, these changes are considered to be of a nature that anyone familiar with the art can apply. For example, the corrugated filter element may be fabricated from sheets of glass fiber mat or cloth rather than from paper, and the core of the filter element may be made of metal, plastic or glass. By employing these different materials of construction, it is possible to adapt the broad con- The invention is hereby claimed as follows:

1. A disposable filter element consisting essentially of a corrugated web and a flat web convolutely wound together, the adjacent flutes formed by the corrugations alternately having one end open and the other end sealed, the sealing of one of said ends being effected by pressing together the edges of said end and the sealing of the other of said ends being effected by applying an adhesive to opposite alternate openings, said webs being permeable to liquids and substantially non-permeable to solids and acting as the filtering medium.

2. A disposable filter element consisting essentially of a corrugated web having corrugations running transversely and a flat web convolutely wound into a generally cylindrical body, said webs being formed of sheet material which is permeable to liquids but substantially non-permeable to solids, the corrugations forming openings at the opposite edges of said body, and means sealing said openings alternately, the alternate openings on at least one edge being sealed with a hardened cement.

3. A disposable filter element consisting essentially of a corrugated web having corrugations running transversely and a flat web convolutely wound into a generally cylindrical body, said webs being formed of sheet material which is permeable to liquids but substantially non-permeable to solids, the corrugations forming openings at the opposite edges of said body, and means sealing said openings alternately, the alternate openings on the opposite edges being sealed with a hardened cement.

4. A method of preparing a disposable filter element which comprises forming a continuous strip of single faced corrugated sheet material consisting of a corrugated web and a flat web which are permeable to liquids but substantially non-permeable to solids, sealing the ends of the flutes formed between the corrugated web and the flat web on one edge of the continuous strip, filling the flutes on the surface of the corrugated web which is opposite the surface adjacent the flat web and on the edge opposite the first sealed edge with a self-hardening semi-fluid cement which when set serves to plug the flute openings, and winding said continuous strip to form a body consisting of a plurality of layers of flutes formed by said webs, the cement in the corrugations when hardened forming a bond between the layers of the wound material.

5. A method of preparing a disposable filter element which comprises applying a self-hardening semi-fluid sealing adhesive adjacent the edge and between a continuous strip of corrugated sheet material and a continuous strip of flat sheet material, said sheet materials being permeable to liquids but substantially non-permeable to solids, bringing said continuous strips together with said adhesive securing said strips together and plugging the ends of the flutes formed between said corrugated web and said flat end to seal said ends of said flutes adjacent one edge of the resultant continuous strip of material, filling the flutes on the surface of the corrugated web which is opposite the surface adjacent the flat web and on the edge opposite the first mentioned edge with a self-hardening semi-fluid adhesive which when set is not permeable to liquids and serves to plug the flute openings, and winding said continuous strips together to form a body consisting of a plurality of layers of flutes formed by said webs, the cement in the corrugations when hardened forming a bond between the layers of the wound material.

6. A method as claimed in claim 4 wherein the flutes formed between the corrugated sheet material and the flat web are sealed by sewing them adjacent one edge and the flutes on the surface of the corrugated web which is opposite the surface adjacent the flat web are sealed adjacent the edge opposite the first mentioned edge with a self-hardening semi-fluid cement which when set serves to plug the flute openings and to form a bond between the layers of the wound material.

JORDAN V. BAUER.
RUSSELL H. CURTIS.

REFERENCES CITED

The following references are of record in the file of this patent:

UNITED STATES PATENTS

| Number | Name | Date |
|---|---|---|
| 425,431 | Hyatt | Apr. 15, 1890 |
| 1,872,430 | Ericson | Aug. 16, 1932 |
| 2,196,821 | Arnold | Apr. 9, 1940 |
| 2,210,397 | Driess | Aug. 6, 1940 |
| 2,427,733 | McCann | Sept. 23, 1947 |
| 2,502,545 | Wellborn | Apr. 4, 1950 |

FOREIGN PATENTS

| Number | Country | Date |
|---|---|---|
| 535,153 | Great Britain | Mar. 1, 1941 |
| 880,486 | France | Mar. 26, 1943 |